(12) United States Patent
Kolari

(10) Patent No.: US 9,927,173 B1
(45) Date of Patent: Mar. 27, 2018

(54) SINGLE PASS CONTINUOUS LUMBER DRYING KILN

(71) Applicant: Gary L. Kolari, Portland, OR (US)

(72) Inventor: Gary L. Kolari, Portland, OR (US)

( * ) Notice: Subject to any disclaimer, the term of this patent is extended or adjusted under 35 U.S.C. 154(b) by 0 days.

(21) Appl. No.: 15/432,532

(22) Filed: Feb. 14, 2017

Related U.S. Application Data

(60) Provisional application No. 62/399,725, filed on Sep. 26, 2016.

(51) Int. Cl.
| | | |
|---|---|---|
| *F26B 15/16* | (2006.01) |
| *F26B 3/04* | (2006.01) |
| *F26B 23/00* | (2006.01) |
| *F26B 25/06* | (2006.01) |
| *B05B 9/04* | (2006.01) |

(52) U.S. Cl.
CPC ............ *F26B 15/16* (2013.01); *B05B 9/0423* (2013.01); *F26B 3/04* (2013.01); *F26B 23/002* (2013.01); *F26B 25/06* (2013.01); *F26B 2210/16* (2013.01)

(58) Field of Classification Search
CPC .......... F26B 15/16; F26B 3/04; F26B 23/002; F26B 25/06; F26B 2210/16; B05B 9/0423
USPC ............................................................ 34/66
See application file for complete search history.

(56) References Cited

U.S. PATENT DOCUMENTS

| | | | | |
|---|---|---|---|---|
| 3,986,268 A | * | 10/1976 | Koppelman | ............... F26B 3/34 34/257 |
| 4,027,602 A | * | 6/1977 | Mott | ...................... F23C 99/005 110/119 |
| 4,261,110 A | | 4/1981 | Northway et al. | |
| 5,228,209 A | * | 7/1993 | Brunner | .................... F26B 7/00 34/417 |
| 5,595,000 A | | 1/1997 | Goodwin, III | |
| 5,915,811 A | * | 6/1999 | DeVore | ................... F26B 3/286 34/212 |
| 5,940,984 A | * | 8/1999 | Moren | .................... F26B 21/06 34/396 |
| 7,043,853 B2 | * | 5/2006 | Roberts | ..................... F26B 9/06 34/396 |
| 7,146,747 B2 | * | 12/2006 | Studd | ...................... F26B 15/12 34/396 |
| 7,194,822 B2 | * | 3/2007 | Kolari | .................. F26B 21/026 34/191 |

(Continued)

FOREIGN PATENT DOCUMENTS

| | | |
|---|---|---|
| WO | 2002025192 A1 | 3/2002 |
| WO | 2006028388 A1 | 3/2006 |
| WO | 2015093986 A1 | 6/2015 |

*Primary Examiner* — Stephen M Gravini

(74) *Attorney, Agent, or Firm* — Marger Johnson

(57) ABSTRACT

A single-pass lumber drying kiln having a main drying chamber, a heat source to provide heat to the main drying chamber, a pre-heating chamber connected to a receiving side of the main drying chamber, the pre-heating chamber having a moisture collector and a kiln entrance, a conditioning chamber connect to an exit of the main drying chamber, the conditioning chamber having a moisture delivery system and a kiln exit, and fans arranged adjacent the pre-heating, conditioning, and the main drying chamber, wherein the fans adjacent the main-drying chamber and the conditioning chamber are synchronized together in a first set and the fans adjacent the pre-heating chamber are synchronized opposite.

18 Claims, 2 Drawing Sheets

(56) References Cited

U.S. PATENT DOCUMENTS

| | | | |
|---|---|---|---|
| 7,370,434 B2 * | 5/2008 | Duncan | F26B 21/086 34/218 |
| 7,963,048 B2 * | 6/2011 | Pollard | F26B 15/12 110/315 |
| 8,397,400 B2 | 3/2013 | Choo et al. | |
| 9,500,408 B2 * | 11/2016 | Spangler | F26B 15/122 |

* cited by examiner

SINGLE PASS CONTINUOUS LUMBER DRYING KILN

RELATED APPLICATION

This application is a continuation of, and claims priority to, U.S. Provisional Patent Application No. 62/399,725, filed Sep. 26, 2016.

BACKGROUND

When timber is harvested and hewn into lumber, it is considered green, that is, the lumber has not been conditioned and has a high internal moisture content. Green wood is often not desirable for use in many applications as the lumber will tend to shrink as it dries, creating gaps or voids when used in construction of structures or objects. Additionally, as the lumber dries, it can warp, split, or crack which can weaken or damage the structure or object created using the green wood. Further, for some applications, the high moisture content of the wood can prevent its use as necessary or desired processes cannot be performed on wood having a high internal moisture content.

To avoid these potentially negative drawbacks, the wood can be seasoned, allowing internal moisture of the wood to evaporate to a desired or sufficient level for use of the wood or lumber in a desired application. A typical method of seasoning wood is to leave the cut lumber outdoors, exposed to the elements, allowing the internal moisture content of the lumber to equalize with the local environment. Once equalized, the lumber will likely not change dimensionally when used in an application, i.e., the lumber will not warp or contract. To achieve this seasoning, the wood or lumber must often be left to season for an extended period ranging from months to years. As such, a large area is needed to store the lumber as it seasons and a seller will have to wait the seasoning time before selling the lumber.

To speed the process of seasoning, the lumber can be placed in a kiln to dry the lumber to the desired internal moisture content more rapidly. Lumber is placed within the kiln and heated to evaporate the internal moisture, seasoning the wood in a fraction of the time required for passively seasoning the wood or lumber outdoors. Kiln drying lumber can increase the cost of the final product as more economic investment is required to purchase and operate the necessary equipment. However, the reduced time to season the lumber and the control over the final moisture content of the lumber can have economic benefits that justify the increased costs to produce the final lumber product.

A typical kiln can be an enclosed unit in which the lumber is placed and a desired process or cycle of heating and cooling the lumber is carried out within. However, the process, while shorter than seasoning outdoors, can take days or months, which can limit the amount of lumber that can be processed through the kiln.

It would be desirable within the industry to have a continuous kiln able to process and dry large volumes of lumber. Additionally, it would be desirable for the kiln unit to be compact and efficient.

DETAILED DESCRIPTION

Figure 1:
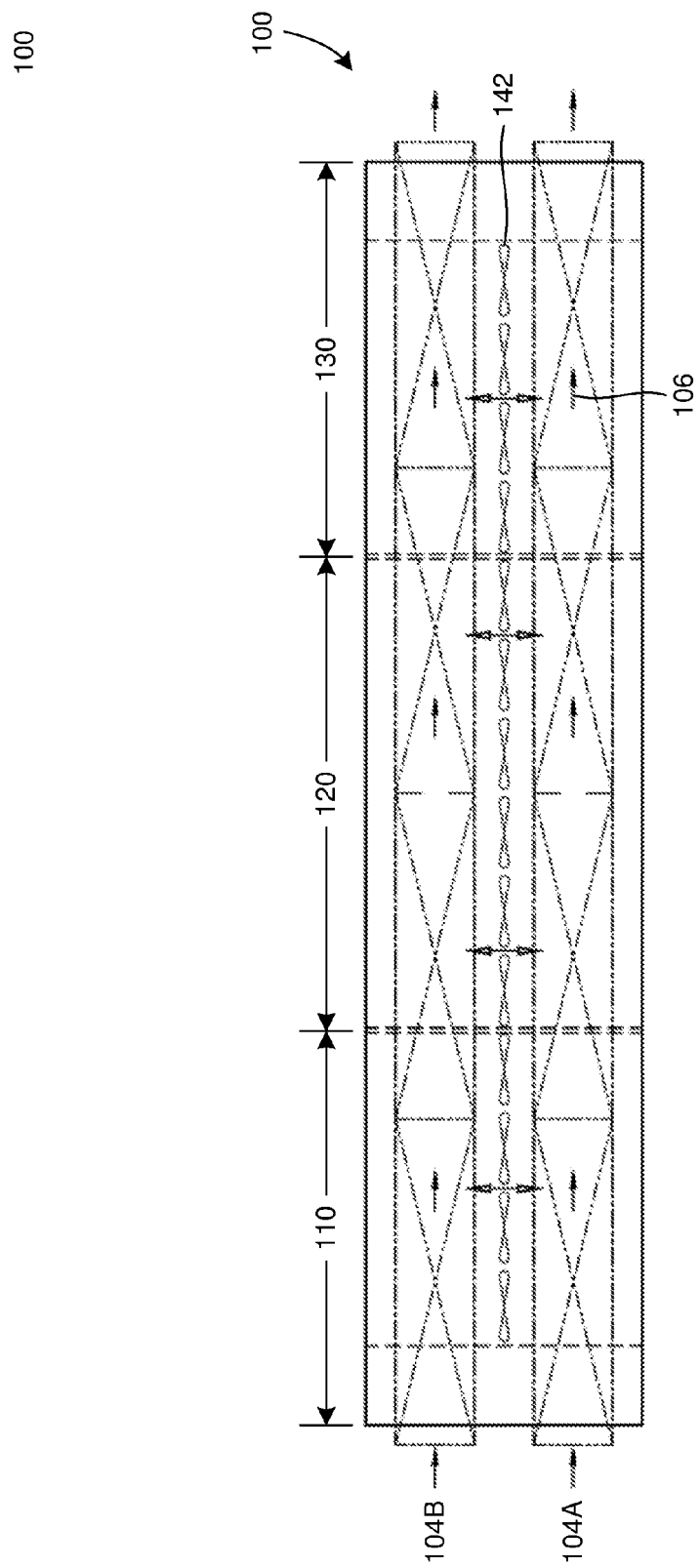
FIG. 1 is a plan view of an example single pass continuous lumber drying kiln.
Figure 2:
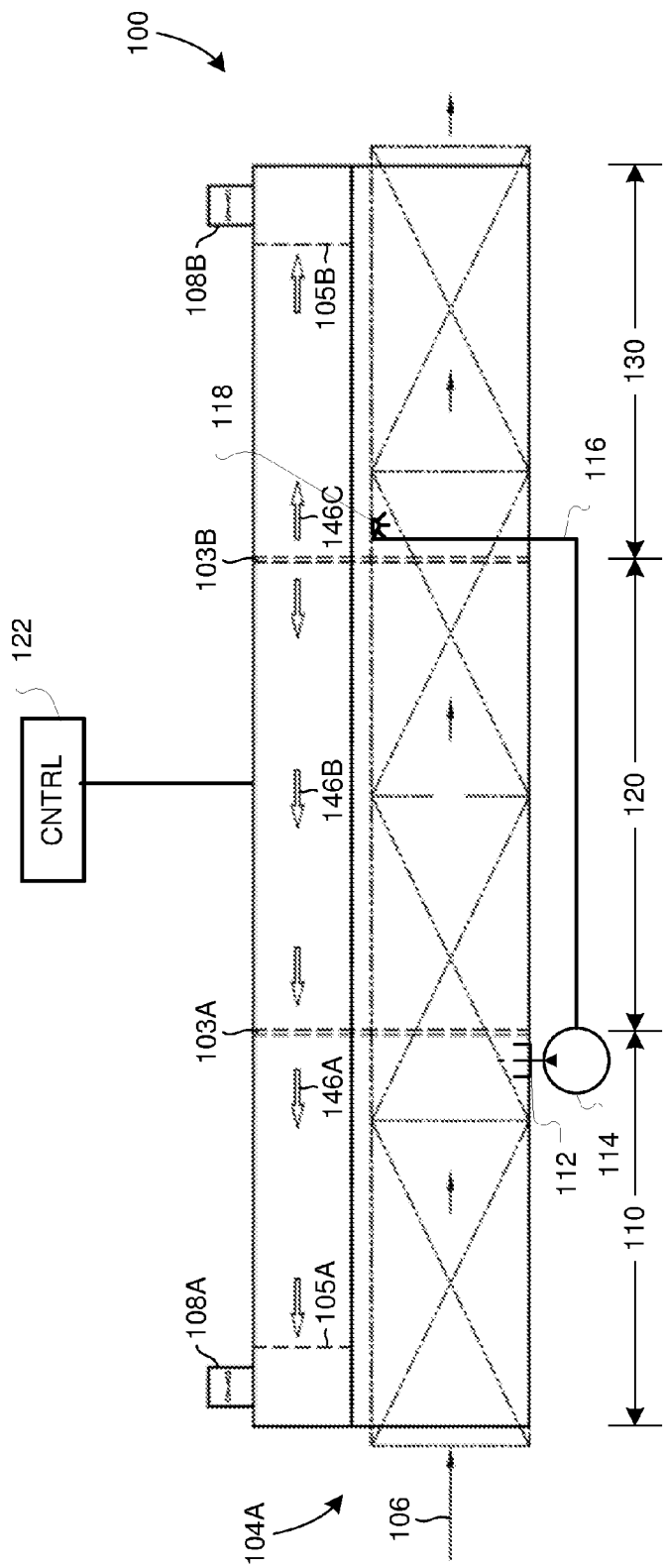
FIG. 2 is an elevation view of the example single pass continuous lumber drying kiln.

An embodiment of a continuous lumber drying kiln 100 is shown in FIG. 1. The kiln 100 includes three chambers, a pre-heating chamber 110, a main drying chamber 120 and an equalizing/condition chamber 130. Raw lumber progresses unidirectionally 106 through the chambers 110, 120 and 130, of the kiln 100, and emerges having a desired moisture content. The amount of time the lumber spends in each of the chambers 110, 120 and 130 can be adjusted based on the species of lumber, the environmental conditions, the starting moisture content of the lumber and other variables that can affect the drying of the lumber to the desired moisture content.

Lumber enters the kiln 100 on two parallel tracks 104A and 104B that run through the entirety of the kiln 100. The lumber can be stacked, spaced apart or otherwise arranged as necessary, onto carts that include wheels that interface with the tracks 104A and 104B. Pushers at a first end of the kiln 100 can push the carts with stacked lumber to be dried into the kiln 100. A continuous chain or other mechanism can engage the carts of lumber to progress them through the various chambers 110, 120 and 130 of the kiln 100. Alternatively, additional carts of lumber added to the tracks 104A and/or 104B can contact other carts of lumber already on the tracks 104A and/or 104B, thereby pushing the line of carts of lumber through the kiln 100.

The lumber to be dried first enters a pre-heating chamber 110 of the kiln 100. In the preheating chamber, the lumber is heated in preparation for the main drying chamber 120. Hot air 146A from the main drying chamber 120 is pushed into the pre-heating chamber 110 by fans 142. The fans 142 operate bidirectionally, pulling the air into the pre-heating chamber 110. The partitions between the two chambers have controllable dampers to allow the air to pass from the main drying chamber to the pre-heating chamber. Exhaust fan 108A positioned near the entrance to the kiln vents the air to the environment external to the kiln.

The heated air 146A incoming from the main drying chamber 120 contains moisture that has been extracted from the lumber within the main drying chamber 120. As the heat from the heated air 146A is transferred into the lumber, the temperature of the air within the pre-heating chamber 110 drops. The temperature within the pre-heating chamber 110 can eventually reach the dew point, at which point the moisture in the air will begin to condense into liquid water. The liquid water can be collected at drain 112 and used within the equalizing/conditioning chamber 130. In this way, the water extracted from the lumber within the main drying chamber 120 can be used as part of the lumber conditioning process, minimizing or reducing the need for external water. A pump 114 may circulate the water to the conditioning chamber 130 through pipes 116. The nozzles such as 118 then use the water to condition the lumber.

From the pre-heating chamber 110, the lumber enters the main drying chamber 120, in which the moisture is driven from the lumber by the application of heat. The amount of time lumber spends within the main drying chamber 120 can be based on the type of wood, the moisture content of the lumber and the size of the lumber pieces. Different types of wood have different internal structures that can influence the rate at which water or moisture is evaporated from the wood and how the evaporation of the moisture effects the structure of the wood. Based on the structure of the type of wood, the drying process time and temperature can be adjusted to ensure a high quality finished product that is suitable for a desired or intended use.

Heat can be supplied to the main drying chamber 120 by a heat source, such as an external burner or steam radiators. Hot air 146B generated by the heat source is circulated about the main drying chamber 120 to evaporate moisture from the lumber within. Fans 142 within the main drying chamber 120 circulate the hot air 146B about the lumber to assist with the transfer of heat into the lumber and the evaporation of moisture from the lumber.

An example heat source can include an external burner that can burn wood scraps, or another fuel source, and the hot exhaust created by burning the fuel can be directed into the main drying chamber 120, thereby heating the chamber 120 and the lumber within. Alternatively, the heat source can include a boiler that generates steam that is directed through steam radiators within the main drying chamber 120 to heat the chamber 120. The boiler can be fired using wood scraps or other fuel sources. Additional alternative heat sources can be included and/or connected to the main drying chamber 120 to generate the requisite heat within the chamber 120 to dry lumber.

In further embodiments, the main drying chamber 120 can consists of several zones having varying temperatures. The lumber can pass through these zones, residing in each zone a set or desired time, to be heated as desired or required. Multiple heat sources, such as radiant heaters or steam radiators, can be used to achieve the requisite or desired temperature in each zone. Alternatively, a single heat source can be used and the output of the heat source distributed among the zones as necessary to achieve the required or desired zone temperatures or temperature profiles.

Chamber partitions 103A and 103B are disposed at either end of the main drying chamber 120 and contain heat within the chamber 120. The chamber partitions 103A and 103B have flexible baffles and dampers to allow the lumber and air to pass into and out of the main drying chamber 120. Heated air 146B flows through the partitions 103A into the adjacent chamber 110. The heated air 146B can be drawn from the main drying chamber 120 into the chambers 110 by fans 142. The air passes from one chamber to the other with the lumber through baffles or dampers in the partitions. Exhaust fans 108A and 108B positioned at either end of the kiln 100 vent the air external to the kiln.

Once done in the main drying chamber 120, the lumber exits and enters the equalizing/condition chamber 130 in which the temperature of the lumber is lowered and the final moisture content is established, often these values mirror the local environment in which the kiln 100 is located. The equalizing/conditioning chamber 130 includes a series of water spray nozzles such as 118. The water spray helps to lower the temperature within the chamber 130, cooling the lumber, and generates humidity to condition the lumber to a desired final moisture content. Again, the amount of time the lumber spends within the equalizing/conditioning chamber 130 will be dependent on several variables, including the type of wood, size of the lumber pieces and the desired properties of the wood.

The water used to condition the lumber within the equalizing/conditioning chamber 130 may be the liquid water collected from the pre-heating chamber 110. The liquid water collected from the pre-heating chamber 110 can be pumped into the equalizing/conditioning chamber 130 through the spray nozzles. If additional water, or clean water, is needed to achieve the necessary humidity within the chamber 130, it can be pulled from external sources, such as a municipal water source. Additionally, an on-site water storage unit can be included so that excess water collected from the pre-heating chamber 110 can be stored and used as necessary.

Hot air 146C may be pulled from the main drying chamber 120 into the equalizing/conditioning chamber 130 because of the exhaust fan 108B. The controlling the amount of hot air 146C in the conditioning chamber avoids evaporation of the liquid water injected into the chamber 130 by the spray nozzles to create the high humidity environment within the chamber 130. The increased humidity within the chamber 130 assists in preventing defects within the lumber caused by the drying process, such as warping and cracking of the lumber pieces.

Hot air entering the equalizing/conditioning chamber 130 from the main drying chamber 120 can be limited or reduced to assist with the cooling of the lumber within the chamber 130. Preventing or reducing hot air entry into the chamber 130 can assist with reducing the temperature of the lumber within the chamber 130 more rapidly. The heat from the lumber will evaporate the injected water spray to create the high humidity environment about the lumber within the chamber 130, which will also assist in removing heat from the lumber. The humid air can then be exhausted from the chamber 130 by the exhaust fan 108B.

Fans 142 within the equalizing/conditioning chamber 130 circulate the humid air about the lumber within the chamber 130. The circulating air helps to transfer heat from the lumber, lowering the temperature of the lumber, and to transfer the moisture into the lumber. Circulating the humid air about the lumber also helps to ensure that all the lumber within the chamber 130 is cooled and hydrated at substantially the same rate.

Divider baffles 105A and 105B are disposed proximate the exhaust fans 108A and 108B, respectively, within the kiln 100. The divider baffles 105A and 105B help to contain the heated air 146A and 146C within the chambers 110 and 130, which assists in maintaining a desired environment about the lumber within each of the chambers 110 and 130. Maintaining a desired environment about the lumber assists with evenly heating, cooling and hydrating the lumber within the chambers 110 and 130.

A central controller such as 122 controls the various operations of the kiln such as the movement of the lumber, the temperature provided from the heat source, and the operation of the fans and the spray nozzles. The fans such as 142 shown in FIG. 1 are associated with the different chambers. The fans associated with the conditioning chamber 130 and the main drying chamber 120 operate in synchronization, and the fans associated with the pre-heating chamber 110 operates in opposite synchronization to the other two. For example, if the fans in 120 and 130 are pushing air in a first direction, the fans in 110 push it in the opposite direction. At different points in the drying process, the fans will reverse, with the fans in 120 and 130 remain synched in the same direction.

Since lumber enters a first end of the kiln 100, the pre-heating chamber 110, and exits a second, opposite, end, the equalizing/conditioning chamber 130, the infrastructure surrounding the kiln 100 can be minimized. Green lumber is simply loaded in at one end of the kiln 100 and dried lumber is removed as the other end. This can increase the efficiency of the drying process as transit of the lumber can be minimized at either end, with raw lumber staged at one end and finished lumber staged at the other. Additionally, this unidirectional kiln 100 design, can minimize the area required for the kiln 100 and any necessary support equipment or thru-ways.

Although specific embodiments have been illustrated and described for purposes of illustration, it will be understood that various modifications may be made without departing from the spirit and scope of the claims.

What is claimed is:

1. A single-pass lumber kiln, comprising:
   a main drying chamber;
   a heat source to provide heat to the main drying chamber;
   a pre-heating chamber connected to a receiving side of the main drying chamber, the pre-heating chamber having a moisture collector and a kiln entrance;
   a conditioning chamber connect to an exit of the main drying chamber, the conditioning chamber having a moisture delivery system and a kiln exit;
   partitions between the main drying chamber and the conditioning chamber, and between the main drying chamber and the pre-heating chamber, the partitions having controllable dampers;
   fans arranged adjacent the pre-heating chamber, the conditioning chamber, and the main drying chamber, wherein some of the fans are arranged between the pre-heating and main drying chamber to transfer heat from the main drying chamber to the pre-heating chamber through the dampers;
   exhaust fans arranged adjacent the kiln entrance and the kiln exit; and
   a fluid path connecting the moisture collector of the pre-heating chamber to the moisture delivery system of the conditioning chamber.

2. The lumber kiln of claim 1, further comprising partitions between the main drying chamber and the conditioning chamber, and between the main drying chamber and the pre-heating chamber.

3. The lumber kiln of claim 1, further comprising a controller to control operation of the kiln.

4. The lumber kiln of claim 1, wherein the main drying chamber has multiple zones, each zone having a different temperature.

5. The lumber kiln of claim 1, further comprising an external water source in addition to the moisture collector.

6. The lumber kiln of claim 1, wherein the moisture collector comprises a drain.

7. The lumber kiln of claim 1, wherein the moisture delivery system comprises at least one spray nozzle.

8. The lumber kiln of claim 1, wherein the fans arranged adjacent the conditioning chamber and the main drying chamber are connected together in a first set, and the fans arranged adjacent the pre-heating chamber are arranged to operate opposite from the first set.

9. The lumber kiln of claim 1, further comprising baffles arranged adjacent the exhaust fans to control movement of air in the chambers.

10. A single-pass lumber drying kiln, comprising:
    a main drying chamber;
    a heat source to provide heat to the main drying chamber;
    a pre-heating chamber connected to a receiving side of the main drying chamber, the pre-heating chamber having a moisture collector and a kiln entrance;
    a conditioning chamber connect to an exit of the main drying chamber, the conditioning chamber having a moisture delivery system and a kiln exit; and
    fans arranged adjacent the pre-heating chamber, conditioning chamber, and the main drying chamber, wherein the fans adjacent the main-drying chamber and the conditioning chamber are synchronized together in a first set and the fans adjacent the pre-heating chamber are synchronized opposite, at least some of the fans arranged to transfer heat between the main drying chamber and the pre-heating chamber.

11. The lumber kiln of claim 10, further comprising partitions between the main drying chamber and the conditioning chamber, and between the main drying chamber and the pre-heating chamber, the partitions having controllable dampers.

12. The lumber kiln of claim 10, further comprising a controller to control operation of the kiln.

13. The lumber kiln of claim 10, wherein the main drying chamber has multiple zones, each zone having a different temperature.

14. The lumber kiln of claim 10, further comprising an external water source in addition to the moisture collector.

15. The lumber kiln of claim 10, wherein the moisture collector comprises a drain.

16. The lumber kiln of claim 10, wherein the moisture delivery system comprises at least one spray nozzle.

17. The lumber kiln of claim 10, wherein the fans arranged adjacent the conditioning chamber and the main drying chamber are connected together in a first set, and the fans arranged adjacent the pre-heating chamber are arranged to operate opposite from the first set.

18. The lumber kiln of claim 10, further comprising baffles arranged adjacent the exhaust fans to control movement of air in the chambers.

* * * * *